Figures 1, 2:
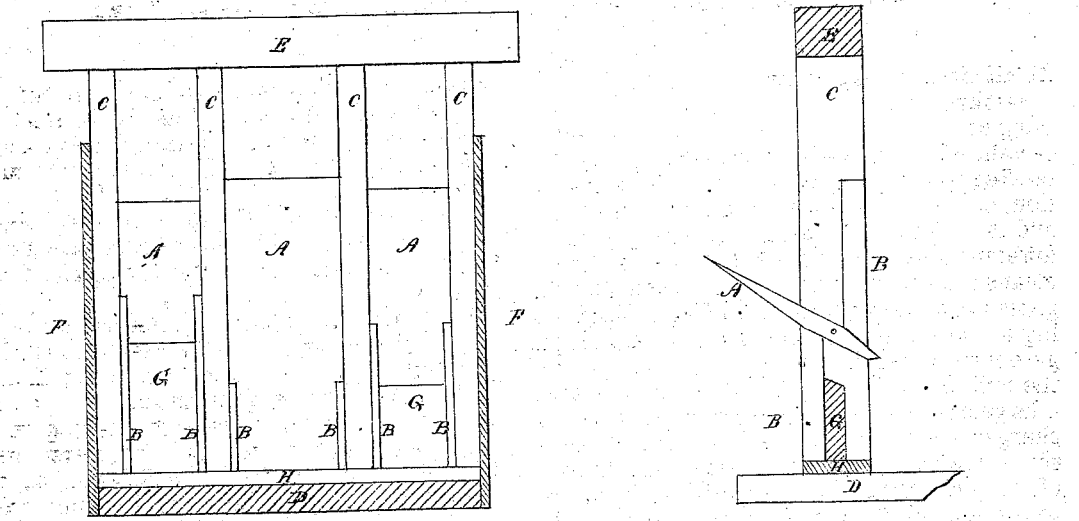

J. P. BOLIN.
Water Regulators.

No. 136,024.                               Patented Feb. 18, 1873.

Witness
A. C. Phin.
Ralph E. B. Stewrtson

Inventor
James P. Bolin

UNITED STATES PATENT OFFICE.

JAMES P. BOLIN, OF ORANGEBURG COUNTY, SOUTH CAROLINA.

IMPROVEMENT IN WATER-REGULATORS.

Specification forming part of Letters Patent No. 136,024, dated February 18, 1873.

*To all whom it may concern:*

Be it known that I, JAMES P. BOLIN, of Orangeburg county, South Carolina, have invented certain new and useful Improvements in Water-Regulators, which are simple in construction, efficient in operation, and durable in use; and it consists in hinging or pivoting gates of different sizes above the mill-breast, by which means the surplus water is discharged and the gates are automatically opened and closed, being an improvement upon the ordinary single gate now in use, by which the whole space of the mill-breast is opened and closed, allowing a large and violent current of water to be discharged when only a small current is necessary, whereas by my improvement the amount of water discharged is automatically regulated to correspond to the rise of the water; and I do hereby declare that the following is a full, clear, and exact description thereof, which will enable others skilled in the art to which it appertains to make and use the same, reference being had to the accompanying drawing with letters of reference marked thereon forming a part of this specification, in which—

Figure 1 is a front elevation of a device embodying my invention; and Fig. 2 is a vertical section, showing one gate open.

A A A are gates of different sizes, suitably pivoted or hung upon axles having bearings in the upright standards C. B B represent cleats secured to the posts C for the gates A to close against. C C represent the upright standards, having the cross-bar E at the top and secured to the floor D at the bottom. F represents the ordinary walling at the sides, and G the mill-breast. H represents the mill-breast bottom.

The construction of the frame-work above may be of any suitable or convenient construction without departing from the spirit of my invention.

The gates are made of different sizes, as shown, so that as the water rises the smaller gate will open first, which may be sufficient to discharge the surplus water. If not, and the water continues to rise, the next gate in size opens, and so on until the water rises until the gates are all opened; then, as the water falls, the gates close in the same order as opened until the water falls to the ordinary level, and thus, by the automatic movement of the gates, the rise and fall of water are regulated as it rises and falls.

Having thus fully described my invention, what I claim, and desire to secure by Letters Patent, is—

The gates A A A, of different sizes, hinged or pivoted between the posts C above the mill-breast bottom H, all constructed and arranged to operate substantially as and for the purpose herein specified.

JAMES P. BOLIN.

Witnesses:
RALPH E. B. STEWETSON,
A. C. PHIN.